Figure 1:
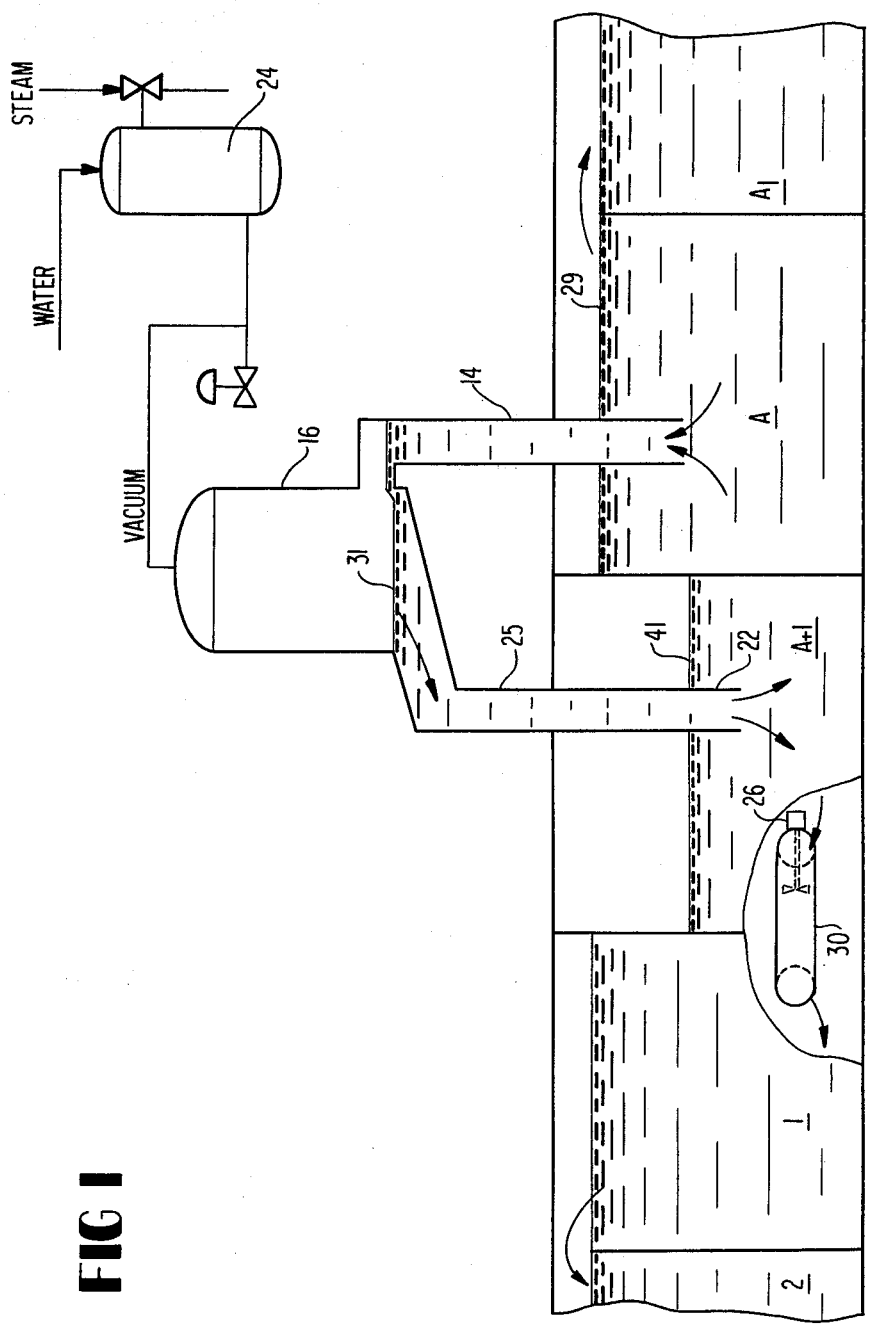

United States Patent [19]

Houghtaling

[11] 4,188,366
[45] Feb. 12, 1980

[54] MANUFACTURE OF PHOSPHORIC ACID

[75] Inventor: Samuel V. Houghtaling, Lakeland, Fla.

[73] Assignee: Société de Prayon, Foret-Trooz, Belgium

[21] Appl. No.: 852,613

[22] Filed: Nov. 18, 1977

[51] Int. Cl.² .................. C01B 25/22; C01F 11/46
[52] U.S. Cl. .................... 423/320; 423/167; 423/319
[58] Field of Search .............. 423/320, 319, 167

[56] References Cited
U.S. PATENT DOCUMENTS

| | | | |
|---|---|---|---|
| 3,257,168 | 6/1966 | Chelminski | 423/320 |
| 3,416,889 | 12/1968 | Caldwell | 423/320 |
| 3,522,003 | 7/1970 | Lopkes | 423/167 |
| 3,522,004 | 7/1970 | Lopkes | 423/167 |
| 3,726,647 | 4/1973 | Somerville | 423/320 |

Primary Examiner—Herbert T. Carter
Attorney, Agent, or Firm—Weiser, Stapler & Spivak

[57] ABSTRACT

A multi-compartment reaction system for the manufacture of phosphoric acid by the wet process having a recirculation slurry flash cooler. The removal of heat from the reaction system is accomplished by circulating reaction zone slurry through an elevated vacuum flash cooler under the combined effect of differential liquid levels maintained in the system, and the vacuum in the flash cooler. The amount of reaction zone slurry passed to the flash cooler is sufficiently large so that the temperature differential experienced by the slurry is low and crystallization of calcium sulfate from the slurry liquid occurs in a favorable manner. There is also a substantial reduction in the pumping requirements compared with conventional operations in which the slurry is pumped to an elevated flash cooler, even though the large amount of slurry is passed to the flash cooler in accordance with the invention. In the process of the invention, reaction slurry is withdrawn from a reactor compartment in which the liquid level is substantially higher than in the reactor compartment to which the slurry passes from the flash cooler. This differential in liquid levels and the effect of the vacuum in the flash cooler cause reaction slurry to flow through the flash cooler to remove heat of reaction without the necessity of pumping.

15 Claims, 2 Drawing Figures

MANUFACTURE OF PHOSPHORIC ACID

This invention relates to the manufacture of phosphoric acid by the wet process, i.e., the reaction of phosphate rock with sulfuric acid to produce phosphoric acid and calcium sulfate.

The reactions which take place in the wet process for the manufacture of phosphoric acid are well known. In present practice, dry or wet ground phosphate rock is added to the reaction system containing a slurry of phosphoric acid and calcium sulfate crystals, and the phosphate rock is dissolved by part of the phosphoric acid. Sulfuric acid is also added and reacts with the dissolved phosphate to form phosphoric acid and calcium sulfate. The calcium sulfate crystallizes out and is separated from the phosphoric acid by filtration and washing. The calcium sulfate crystallizes as gypsum [$CaSO_4.2(H_2O)$] under the conditions employed in most commercial operations of the process, and the crystals are water washed substantially free of phosphoric acid in a filtration system, and at least some of the washings are returned to the reaction system.

The production of phosphoric acid by the wet process is an exothermic reaction and, in addition, there is heat of dilution of the concentrated sulfuric acid added. Accordingly, relatively large quantities of heat must be removed in order to maintain the desired temperature in the reactor system. The removal of exothermic heat of reaction and heat of dilution is typically accomplished by one or the other of two methods and, occasionally, by a combination of both. In one method air is blown into the slurry in the reaction system, and in a second procedure, heat is removed by vacuum cooling the reaction mixture. Most often in the latter operation, a portion of the reaction slurry is pumped into an elevated vacuum chamber where the reduced pressure causes the boiling-off of water, and the cooled slurry is returned, usually via a barometric leg, to the reactor system. In addition to removing heat, the circulation of reaction slurry through the flash cooler serves to provide a recirculation effect since the slurry is generally taken from one section of the reactor system, cooled and returned to another reactor section to thereby provide a mixing effect. Since the flash cooler is maintained under vacuum and the cooled slurry is usually returned to the reaction system by way of a barometric leg or column of slurry which terminates beneath the liquid level in the receiving reactor section, the vacuum in the flash cooler will have a tendency to cause backflow into the flash cooler unless the latter is positioned at a height such that the liquid level therein is sufficiently elevated to insure that the desired flow direction is maintained. These factors have led to the necessity of pumping substantial quantities of reaction slurry to relatively high levels with attendant high-power cost, high slurry line and pump maintenance, etc., in order to attain adequate heat removal from the system. Practical limitations on the permissible cost of the pumping operation has meant that the reduction of slurry temperature per pass through the vacuum cooler has been fairly high to achieve adequate water and heat removal from the reaction slurry. The heat removal cools the slurry resulting in super-saturated solution, and precipitation of solids will occur. It has been found that if the slurry temperature is reduced by over about 9° F., excess precipitation may occur that will cause heavy scale in the flash cooler body and barometric leg of the flash cooler. Such temperature reductions in the flash cooler may also cause the precipitation of very fine crystals of calcium sulfate due to increased nucleation adversely affecting the filterability of the slurry and the washing operation which handles the calcium sulfate produced in the reaction system.

It is desired in commercial variations of the wet process to introduce the phosphate rock and sulfuric acid to the reaction system in such a manner and under such conditions as to avoid excessive localized concentrations of dissolved phosphate rock, as well as to avoid excessive concentrations of unreacted sulfuric acid in the reaction system. Most commercial operations employ some means of recirculation within the reactor system of the reaction slurry containing phosphoric acid and calcium sulfate crystals in order to minimize the opportunity for there being excessive concentrations of reactants in any localized area. Generally, this recirculation involves a combination of internal recirculation produced by a stirrer or agitator in a given reaction compartment, plus some recirculation of reactor slurry from one stage of the reactor system to another stage, e.g., from a later stage to an earlier stage. Recirculation costs are significant even though they be reduced somewhat by the recirculation effect of the flash cooler operation, but the volume of slurry which can be recirculated through the cooler is economically limited due to the high cost of pumping larger volumes of fluid to the relatively high level of the flash cooler, as noted above.

The present invention concerns a process and apparatus suitable for the manufacture of phosphoric acid by the wet process. The invention relates to a manner of removing heat from the reaction system by the use of a vacuum flash cooler to which the flow of a relatively large amount of the aqueous reaction slurry containing phosphoric acid and undissolved calcium sulfate solids is accomplished through the use of differential liquid slurry levels in separate reaction zones of the system and the vacuum effect of the flash cooler, and without the necessity of pumping the slurry to the flash cooler. The amount of slurry passed each hour to the flash cooler in such manner is at least about 500 weight percent of the total amount of slurry in the reaction system, and the decrease in temperature of the slurry passing through the flash cooling operation is relatively low, e.g., the temperature differential may be about 6° F. or less. As a result calcium sulfate precipitates from the slurry in a favorable manner facilitating its ultimate separation from the phosphoric acid product and alleviating difficulties arising from the precipitation of calcium sulfate solids on equipment surfaces. In this invention the reaction slurry passes from a reaction zone in which a first liquid level is maintained, through an elevated flash cooler in which the liquid level is maintained substantially above that in the reaction zone from which the slurry is supplied to the flash cooler, and then to another reaction zone of the system in which the level of liquid slurry is maintained at a substantially lower level than the slurry level in the reaction zone from which the slurry passes to the flash cooler. These differentials in liquid levels and the extent of vacuum in the flash cooler are sufficient for the slurry to flow by way of a barometric column of slurry to, through and from the flash cooler without the necessity of using pumping equipment. An adequate flow of slurry to the flash cooler can thus be maintained to remove up to substantially all of the heat produced in the system which is not withdrawn or lost by other means. Generally, at least the major portion of the heat of reaction and heat of sulfuric acid dilution can be withdrawn from the reaction system by use of the described barometric column flow without pumping.

Aside from the fact that considerable pumping costs are avoided by the use of the present invention as compared with the conventional vacuum flash cooler system to which the slurry is pumped, other savings and advantages accrue. Since the essential flow of slurry to the flash cooler is by way of the barometric column, prior economic restrictions on the amount of slurry that may be passed to the flash cooler no longer prevail, and the volume of slurry cooled, accordingly, can be increased substantially. As a result, the removal of a given amount of heat from the system can require a smaller temperature drop in the liquid slurry going through the flash cooler, and thus the removal of less water from a given portion of the slurry. The latter effect represents less concentration of solids in the slurry, and the problems of excessive precipitation of calcium sulfate crystals and their relatively small size can be decreased. This can avoid difficulties resulting from excessive deposition of fines in the flash cooler and its flow lines, as well as those associated with the filtration and washing of the calcium sulfate crystals. Since in the present invention the liquid slurry level in the reaction vessel to which the slurry is passed from the flash cooler by way of the barometric column is lowered, the liquid level in the flash cooler, and therefore the flash cooler itself, may be at a lower height than in conventional pumping-flash cooler operations without encountering the problem of backflow through the barometric column to the flash cooler. The ability to flow an increased amount of slurry through the flash cooler in accordance with the present invention may also increase the recirculation effect of the flash cooler operation, and result in a decrease in the amount of, or even eliminate, separate recirculation capacity that need be provided in the system.

In a multi-compartment reactor system conventionally used for making wet phosphoric acid by the wet process, for instance, ground phosphate rock is charged to a reactor system compartment, and sulfuric acid and recycled dilute phosphoric acid from the calcium sulfate washing operation may be introduced into the same or another of the reaction compartments. Each of the compartments may be provided with agitation means, and there may be general circulation of the slurry serially through the compartments or at least those involved in the cyclic recirculation of the slurry. One or more of the compartments may be used to handle the portion of the slurry representing the net make which is passed to equipment for separating calcium sulfate crystals and liquid phosphoric acid product. Slurry being recycled through the reaction system is drawn from compartments involved in such circulation and passed to a flash cooler by means of a pump. The slurry flows from the flash cooler by gravity into another of the compartments involved in recirculating the slurry. The bottom of flash cooler is generally sloped towards the slurry outlet to facilitate the flow of slurry therefrom and to avoid settling of solids. The portion of the slurry representing net make can be withdrawn from the recirculation path and sent to phosphoric acid and calcium sulfate separation facilities. The liquid levels in the various reaction compartments are essentially the same and the compartments are at approximately atmospheric pressure. A vacuum is drawn on the flash cooler by a steam-jet system to provide the desired vacuum and temperature reduction in the slurry undergoing cooling. Recirculation pumps are used to recycle the slurry through the system of compartments.

A typical plant operating in such manner may produce 1,250 tons of phosphoric acid ($P_2O_5$) per day at a recirculation flow of approximately 54,000 gpm. Such a system may have two flash coolers, each having a 300-horsepower pump with a throughput of approximately 13,500 gpm, and the slurry outlets of the coolers are about 17 feet above the liquid level in the compartments. Additionally the system has two circulating pumps of about 50 horsepower each. At an absolute pressure in the flash cooler of about 9 inches mercury, there may be a temperature reduction between the input slurry and output slurry from the flash cooler of about 8° to 9° F. At this temperature difference, there may well be some scaling in the flash cooler equipment due to the removal of sufficient water to cause undue precipitation of small calcium sulfate crystals.

Figure 2:
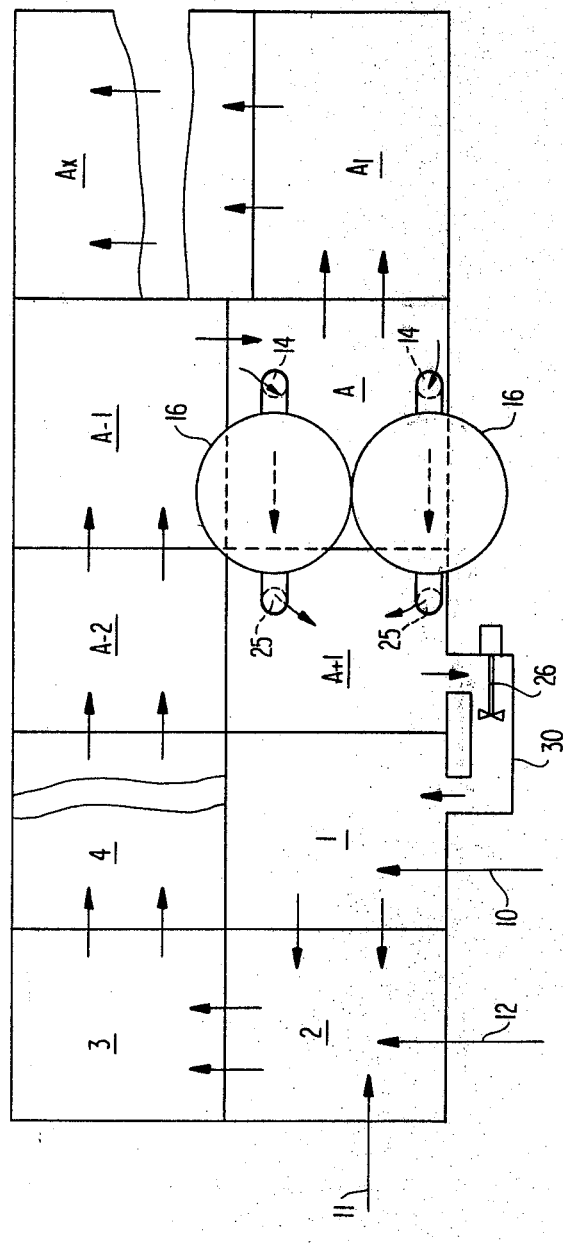

The foregoing and other advantages of the present invention will be apparent from the following description made in conjunction with the drawings in which:

FIG. 1 is a partial side elevation view of a wet phosphoric acid system in accordance with the present invention; and FIG. 2 is a top plan view of the wet phosphoric acid system of FIG. 1.

With reference to the drawings, a multi-compartment reactor system for the wet phosphoric acid process is shown. The multi-compartment system may typically have at least about 4 compartments and may have up to about 14 or more compartments. In the system shown, phosphate rock is introduced through line 10 to compartment 1, and sulfuric acid and recycled dilute phosphoric acid from the calcium sulfate washing operation are introduced through lines 11 and 12, respectively, into compartment 2. Each of the compartments may be provided with agitation means (not shown), and there may be general circulation of the slurry through the compartments in numerical order, from 1 to 4 or more, A−2, A−1, A, and A+1 and then back to compartment 1 as indicated by the arrows in FIG. 2. The net make of slurry in compartment A passes sequentially to compartments A1 to Ax, and then to phosphoric acid and calcium sulfate separation facilities, not shown.

Slurry to be cooled passes from compartment A through line 14 to flash cooler 16 due to a differential in liquid levels in compartments A and A+1 and vacuum in flash cooler 16. The slurry flows from flash cooler 16 by gravity through pipe 25 into compartment A+1. The bottom of cooler 16 is generally sloped towards the slurry outlet to facilitate the flow of slurry therefrom and to avoid settling of solids. Typically, the temperature of the slurry fed to the flash coolers may be between about 155° to 190° F., more often about 165° to 180° F.

The liquid levels in all compartments, except A+1, are essentially the same and all of the compartments are at approximately atmospheric pressure. A vacuum is drawn on the flash cooler by steam-jet system 24 to provide the desired vacuum and temperature reduction in the slurry undergoing cooling. Recirculation pump 26 takes the recycled slurry from compartment A+1 and returns it to compartment 1.

The operation of the system of FIGS. 1 and 2 can be appreciated by description of the nature and operation of the flash coolers 16 and compartments A and A+1 and their associated equipment. Two flash coolers 16 are depicted merely for purposes of illustration; one may be sufficient.

The general level of the liquid reaction slurry exposed to substantially atmospheric pressure, e.g., the liquid level in compartments 1 to 4, A−2, A−1, A and A1 to Ax, can be essentially the same. Vacuum flash coolers 16 are positioned above the reactor system, but at a relatively low level compared with conventional operations. Each of the flash coolers 16 is in flow communication with compartment A by a line 14 which extends from beneath the liquid level in compartment A into the side of its respective flash cooler 16. Flash coolers 16 have a relatively large cross-section compared with that of the slurry inlet line 14 to facilitate the exposure of larger volumes of the slurry to the vacuum conditions in the cooler and thereby facilitate the removal of water and the reduction in the temperature of the slurry. The slurry introduced into flash coolers 16 is reduced in water content and exits through line 25 leading from the bottom of each flash cooler 16 to below the liquid level 41 maintained in compartment A+1. The latter liquid level is substantially below that in compartment A, and the liquid level in the flash coolers is maintained substantially above that in compartment A. These differentials in liquid levels and the effect of the vacuum in the flash cooler provide for the desired flow of reaction slurry from compartment A to and through the flash coolers 16 and into compartment A+1 by maintaining corresponding liquid barometric columns. Typically, the liquid level differential between the slurry level 31 in flash coolers 16 and level 29 in compartment A may be about 10 to 15 feet, preferably about 11 to 13 feet, while the liquid level differential between the slurry level 31 in flash coolers 16 and level 41 in compartment A+1 may be about 13 to 18 feet, preferably about 14 to 16 feet. The liquid level differential between the slurry level 29 in compartment A and level 41 in compartment A+a may be at least about 1 foot, say about 1 to 5 feet, preferably about 2 to 4 feet. The charging of slurry into flash coolers 16 by way of lines 14 is preferably above the slurry outlet leading into line 25 and above the liquid level 31 maintained in the flash coolers 16. The latter liquid level is preferably maintained below the entrance of liquid slurry from lines 14 into their respective flash coolers 16. Even if the level of the liquid slurry in a flash cooler is below the lower edge of the slurry inlet and there is free falling of liquid into the flash cooler, the barometric column is maintained from compartment A to compartment A+1 due to the maintenance of vacuum in the flash cooler. The difference in levels between the slurry inlets and outlets in flash coolers 16 and the downward inclination, say of about 10° to 30°, of the bottom of the flash coolers 16 in the direction from the slurry inlet towards the slurry outlet, facilitate the movement of slurry through the vessel without substantial separation or settling of solids from the slurry.

In the operation of flash coolers 16, the difference between the approximately atmospheric pressure generally prevailing in the vapor space above compartment A and the vacuum above the liquid level in flash coolers 16 forces liquid up inlet pipes 14 and into the flash coolers. This flow rate may be, for example, about 500 to 1000% per hour of the total slurry mixture undergoing reaction, preferably about 700 to 800%. The difference in height between the liquid level in the flash coolers and that in compartment A+1 is sufficient to cause the slurry to pass from flash coolers 16 by lines 25 into compartment A+1 by gravity, and thus without the necessity for pumping. The volume of such flow is the result of various factors such as the specific gravity of the slurry in compartment A, the magnitudes of the different levels involved, and the differential between the absolute pressure in the vapor spaces above compartments A and A+1, and that in flash coolers 16. Typically, such pressure differentials are about 12.2 to 9.2 pounds per square inch (psi), preferably about 10.2 to 11.2 psi. Thus, the absolute pressure on the flash coolers may be about 2.4 to 5.4 psi, preferably about 3.4 to 4.4 psi.

As previously noted, the foregoing pressures and liquid level differentials are such that the desired heat removal is accomplished in flash coolers 16. Such heat removal is accompanied by loss of water from the slurry and a corresponding increase in solids concentration. For example, the slurry which may contain upon entering the flash coolers about 25 to 45% of crystalline solids, preferably about 36 to 42 weight percent, may undergo an increase in solids concentration of about 0.07 to 0.21 weight percent, preferably about 0.08 to 0.13%.

With a typical slurry of about 1.6 specific gravity and absolute pressure of 9 inches of mercury on the flash coolers, the distance between the liquid levels in compartment A and flash coolers 16 may be approximately 12 feet. The liquid level in compartment A+1 to which the outlets of the flash coolers feed is maintained about 15 feet below the liquid level in flash coolers 16 and about 3 feet below the level of the liquid in compartment A.

Further, with this example, the flash coolers 16 in the system of FIGS. 1 and 2 can have a total input of 54,000 gpm and the temperature difference in the vacuum cooler will be about 4.5° F., or approximately one-half the temperature difference which occurs in the conventional system described above. With this lower temperature difference, there may be substantially less concentration and precipitation of solids, and less scaling, in the flash coolers. The actual temperature difference occurring in the flash coolers depends upon the vacuum drawn therein and the flow rate of the slurry. As is well known, the liquid exposed to the vacuum will be reduced in temperature, virtually instantaneously, to its boiling point at that pressure. Typically, this decrease in temperature is about 3° to 6° F., preferably about 4° to 5° F. In the foregoing example, the flow rate of slurry into flash coolers 16 is approximately twice that into the flash cooler of the conventional system. There are, however, practical limitations upon the extent of vacuum which can be used, since if the absolute pressure is too low, the vapor velocity of the water drawn off the slurry will be so fast that it may pull or entrain phosphoric acid from the slurry and reduce the overall efficiency of the reactor system, which is undesirable.

Since the absolute pressure has a direct relationship to the boiling point, a reduction in the absolute pressure will cause additional flashing of water vapor to reduce the slurry temperature to the boiling point. In order to maintain the correct water and heat balance at a given production rate, the correct absolute pressure must be maintained in the flash cooler. The correct absolute pressure will vary with the production rate. If the production rate is increased, the absolute pressure must be decreased. In turn if the production rate is decreased, the absolute pressure must be increased.

The level of the slurry in compartment A+1 can be maintained by a pumping system. The pumping system can operate on the side of the reactor system, as shown by pipe 30 and pump 26. In the above example, with a 3-foot difference between the liquid levels in compartment A+1 and compartment A, a single pump of approximately 150 horsepower may be required. As shown in FIG. 2, there may be two flash coolers 16; however, a single flash cooler can be used, as stated above. Depending upon the recirculating rate, the size of inlet pipe 14 to a single flash cooler can reach such proportions that it is difficult to maintain proper flow. Under these circumstances, it can be desirable to use two smaller flash coolers.

It is claimed:

1. In a process for the manufacture of phosphoric acid from phosphate rock and sulfuric acid by the wet process in which there is an aqueous slurry reaction mixture containing phosphoric acid and undissolved calcium sulfate solids at substantially atmospheric pressure, and in which said reaction mixture is passed to a vacuum flash cooling zone for removing heat from the reaction system, the improvement comprising conducting said process with a level of liquid slurry in a first reaction zone of said reaction system, a level of liquid slurry in a second reaction zone of said reaction system which level is substantially below said liquid level in said first zone, a barometric column of liquid slurry extending from said first zone to said vacuum flash cooling zone which is substantially above said liquid level in said first zone, and a barometric column of liquid slurry between said vacuum flash cooling zone and said liquid slurry in said second zone, passing said reaction slurry without pumping from said first zone, through the vacuum flash cooling zone to said second zone at a rate of at least about 500% per hour of the total mixture in the reaction system to remove heat from said slurry, and maintaining said flow rate through said vacuum flash cooling zone and the level differential between said first and second zones of said reaction system at values at which the temperature differential of the reaction mixture passing into and out of said flash cooling zone is only up to about 6° F.

2. The process of claim 1, wherein pressure differential between said reaction mixture in said first zone and said flash cooling zone is about 9.2 to 12.2 psi.

3. The process of claim 1, wherein the differential in temperature of the reaction mixture passing into and out of said flash cooling zone is about 3° to 6° F.

4. The process of claim 3, wherein said temperature differential is about 4° to 5° F.

5. The process of claim 1, wherein the liquid level in said second zone is about 1 to 5 feet below that in said first zone.

6. The process of claim 1, wherein said liquid slurry passing from said first zone to said flash cooling zone in an hour is in an amount of about 500 to 1000% of the total mixture in said reaction system.

7. The process of claim 1, wherein said flash cooling rate is about 700 to 800% per hour of the total reaction mixture.

8. The process of claim 1, wherein said reaction mixture slurry entering said vacuum flash cooling zone comprises about 25 to 45% crystalline solids and in said vacuum flash cooling zone undergoes an increase in solids concentration of about 0.07 to 0.21 weight percent.

9. The process of claim 1, wherein said reaction mixture slurry entering said vacuum flash cooling zone comprises about 36 to 42% crystalline solids and in said vacuum flash cooling zone undergoes an increase in solids concentration of about 0.08 to 0.13 weight percent.

10. The process of claim 1, wherein said reaction system comprises at least 4 reaction zones.

11. The process of claim 10, wherein said reaction system comprises from 4 to 14 reaction zones.

12. In a process for the manufacture of phosphoric acid from phosphate rock and sulfuric acid by the wet process in which there is an aqueous slurry reaction mixture containing phosphoric acid and undissolved calcium sulfate solids at substantially atmospheric pressure and in which said reaction mixture is passed to a vacuum flash cooling zone for removing heat from the reaction system, the improvement comprising conducting said process with a level of liquid slurry in a first zone of said reaction system, a level of liquid slurry in a second zone of said reaction system which level is about 1 to 5 feet below said liquid level in said first zone, a barometric column of liquid slurry extending from said first zone to said vacuum flash cooling zone which is about 10 to 15 feet above said liquid level in said first zone, and a barometric column of liquid slurry between said vacuum flash cooling zone and said liquid slurry in said second zone, whereby reaction slurry flows without pumping from said first zone to the flash cooling at a rate of about 500 to 1000% of the total reaction mixture per hour, flashing said liquid slurry in said flash cooling zone at an absolute pressure of about 2.4 to 5.4 psi, to reduce the temperature of the reaction mixture by about 3° to 6° F., and passing resulting slurry to said second zone.

13. The process of claim 12, wherein said reaction system comprises at least 4 reaction zones.

14. A process for the manufacture of phosphoric acid from phosphate rock and sulfuric acid by the wet process in which there is an aqueous slurry reaction mixture containing phosphoric acid and undissolved calcium sulfate solids at substantially atmospheric pressure and in which said reaction mixture is passed to a vacuum flash cooling zone for removing heat from the reaction system, the improvement comprising conducting said process with a level of liquid slurry in a first zone of said reaction system, a level of liquid slurry in a second zone of said reaction system which level is about 2 to 4 feet below said liquid level in said first zone, a barometric column of liquid slurry extending from said first zone to said vacuum flash cooling zone which is about 11 to 13 feet above said liquid level in said first zone, and a barometric column of liquid slurry between said vacuum flash cooling zone and said liquid slurry in said second zone, whereby reaction slurry flows without pumping from said first zone to the flash cooling at a rate of about 700 to 800% per hour of the total reaction mixture, flashing said liquid slurry in said flash cooling zone at an absolute pressure of about 3.4 to 4.4 psi, to reduce the temperature of the reaction mixture by about 4° to 5° F., and passing resulting slurry to said second zone.

15. The process of claim 14, wherein said reaction system comprises at least 4 reaction zones.

* * * * *